United States Patent [19]

Suzuki et al.

[11] Patent Number: 5,722,768
[45] Date of Patent: Mar. 3, 1998

[54] LAMP UTILIZING DISCHARGE BULB AS LIGHT SOURCE AND HAVING REDUCED SIZE

[75] Inventors: Takanori Suzuki; Yuji Fujino; Takashi Hori; Masatoshi Yoneyama, all of Shizuoka, Japan

[73] Assignee: Koito Manufacturing Co., Ltd., Tokyo, Japan

[21] Appl. No.: 670,580

[22] Filed: Jun. 26, 1996

[30] Foreign Application Priority Data

Jun. 28, 1995 [JP] Japan ..................... 7-183249
Feb. 23, 1996 [JP] Japan ..................... 8-036050

[51] Int. Cl.⁶ .......................................... B60Q 1/00
[52] U.S. Cl. .................. 362/265; 362/61; 362/226; 362/375
[58] Field of Search ...................... 362/61, 226, 263, 362/265, 365, 374, 375

[56] References Cited

U.S. PATENT DOCUMENTS

| | | | |
|---|---|---|---|
| 4,405,974 | 9/1983 | Quiogue | 362/375 |
| 4,489,368 | 12/1984 | Sangiamo et al. | 362/375 |
| 5,072,348 | 12/1991 | Tsukada | 362/226 |
| 5,107,405 | 4/1992 | Makita | 362/61 |
| 5,113,330 | 5/1992 | Makita | 362/265 |
| 5,188,444 | 2/1993 | Makita et al. | 362/80 |
| 5,228,766 | 7/1993 | Makita et al. | 362/61 |
| 5,586,015 | 12/1996 | Baldwin et al. | 362/263 |

*Primary Examiner*—Alan Cariaso
*Attorney, Agent, or Firm*—Sughrue, Mion, Zinn, Macpeak & Seas, PLLC

[57] ABSTRACT

A lamp using a discharge bulb as a light source in which the size thereof in axial directions is reduced. A discharge bulb incorporated in a lamp body is used as a light source. A lighting circuit for lighting the discharge bulb is accommodated in a case, and the case is integrated with the lamp body 1. The lighting circuit accommodating case, which is thin-structured, is arranged on the back side of a socket connector of the discharge bulb, and a circuit section constituting the lighting circuit is arranged in an outer circumferential region of the socket connector. Since the lighting circuit is arranged to the rear of the socket connector, it is not necessary to provide a space for arranging the lighting circuit, and therefore the lamp can be made thin. In addition, the discharge bulb can be mounted and removed through a space in the lighting circuit.

19 Claims, 8 Drawing Sheets

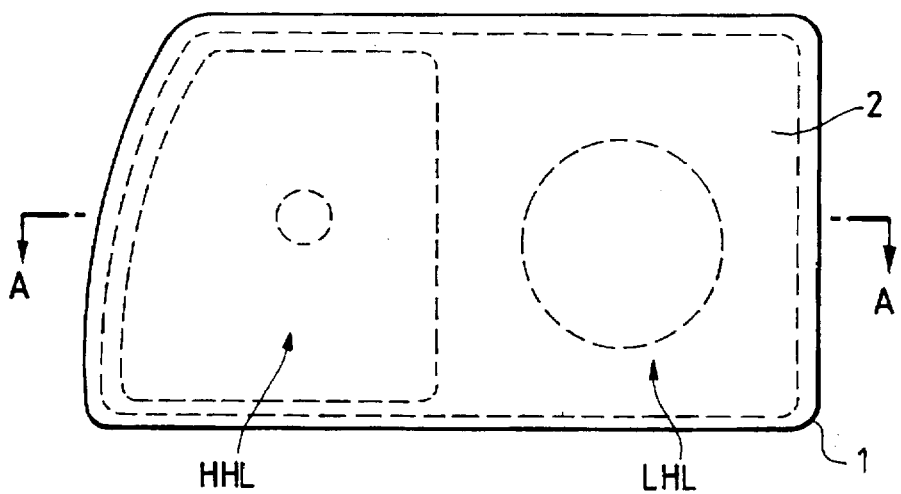
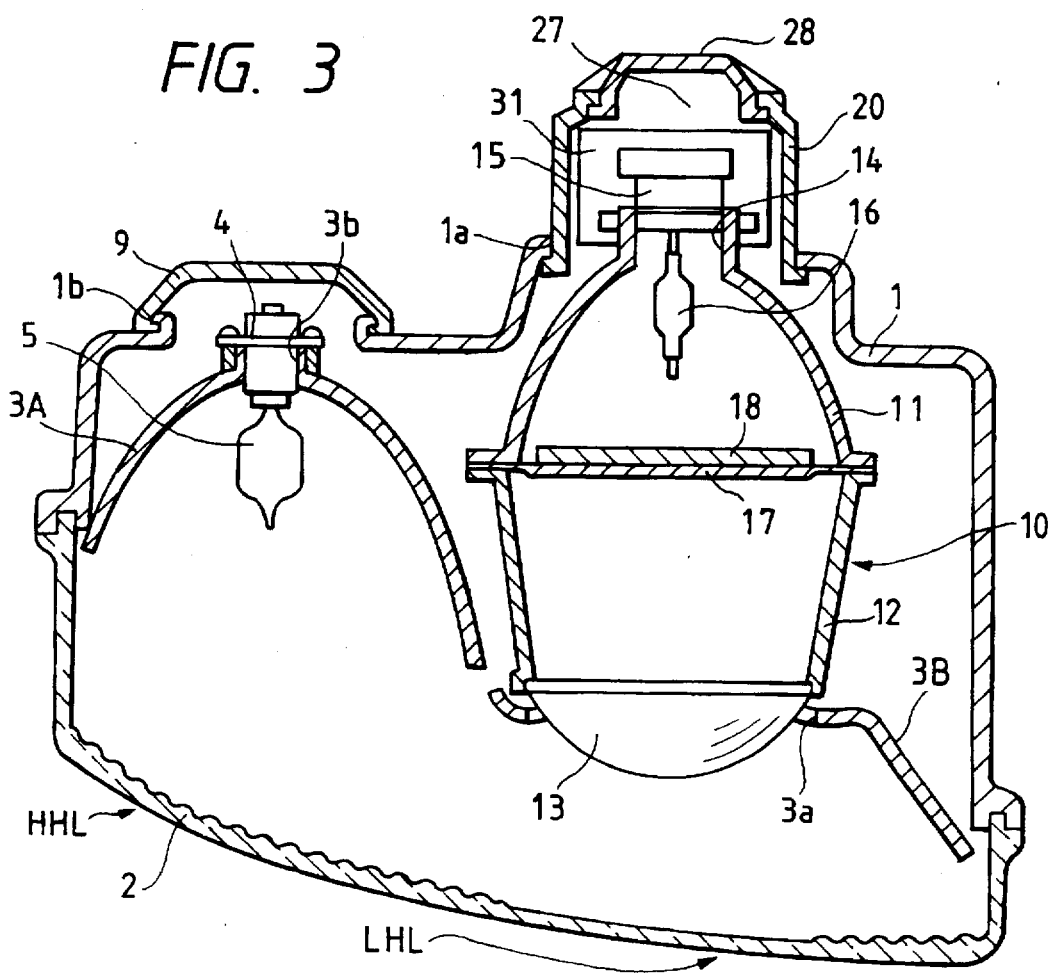

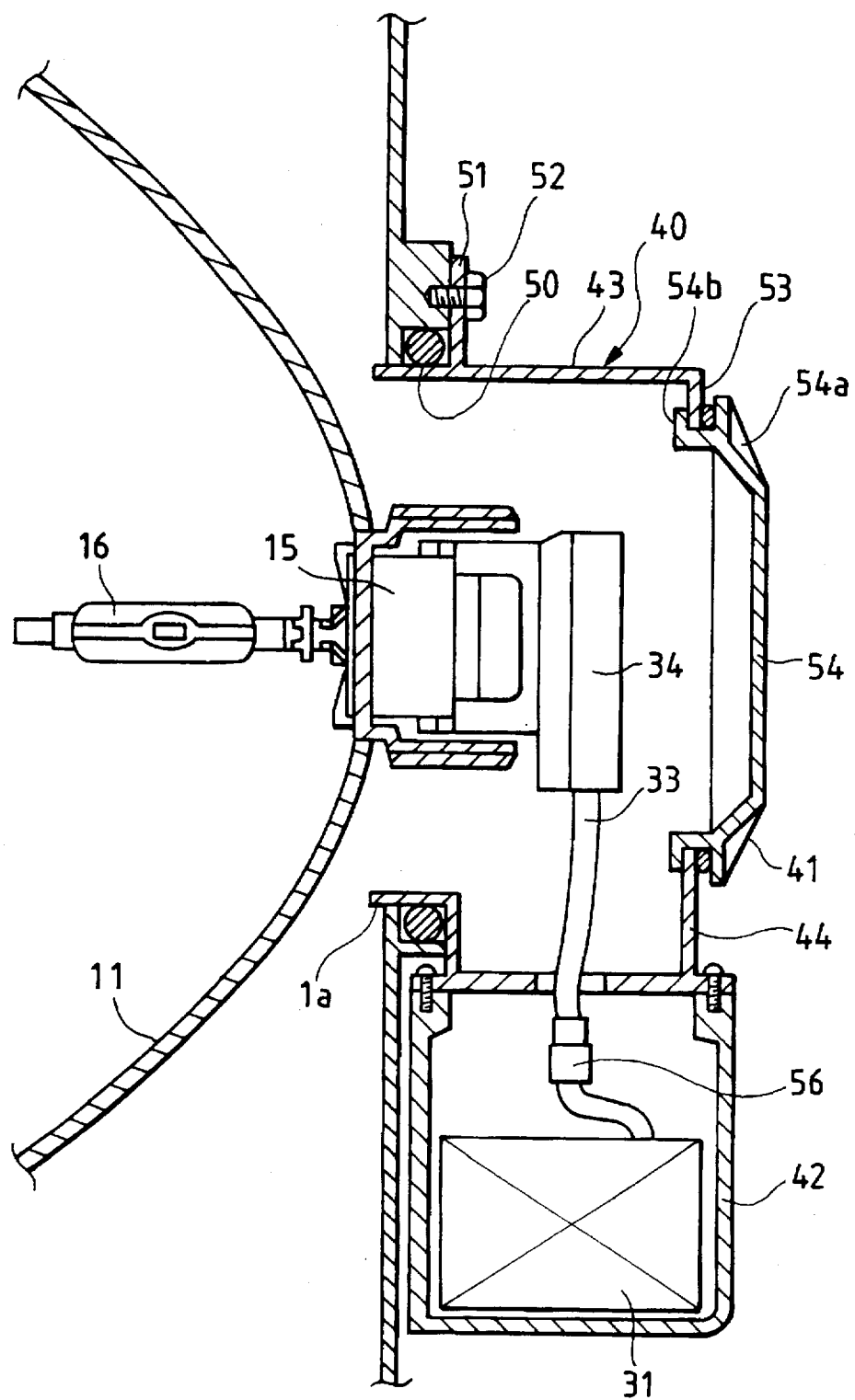

5,722,768

1

LAMP UTILIZING DISCHARGE BULB AS LIGHT SOURCE AND HAVING REDUCED SIZE

BACKGROUND OF THE INVENTION

The present invention relates to lamps using a discharge bulb as a light source, the lamps having a thin design and allowing for easy discharge bulb mounting and replacement.

For lamps requiring comparatively high luminance levels, such as headlamps or searchlights for automobiles, lo studies have been conducted on the use of a discharge bulb for the light source for such lamps since discharge bulbs have excellent luminous efficiency and color rendering properties as well as satisfactory life. However, a discharge bulb requires a high operating voltage, which in turn requires that a lighting circuit for boosting the voltage of the power supply (battery or alternator) be attached to the lamp. In this case, since the high voltage is generated at a secondary winding of the lighting circuit, it is required that the connecting wires to the secondary winding be as short as possible for safety reasons. Therefore, components such as a transformer and a capacitor constituting a booster circuit, i.e., a starter circuit, are generally incorporated in a lighting circuit unit that is arranged integrally with the lamp body.

FIG. 10 shows an example proposed by the present applicant in Unexamined Japanese Patent Publication No. Hei. 4-280603. FIG. 10 is a schematic sectional view of a part of a lamp constructed as a headlamp of an automobile. A headlamp unit 103 having a discharge bulb 104 as a light source is incorporated in a lamp chamber formed of a lamp body 101 and a lens 102. A lighting circuit unit 105 is removably attached to the back of the lamp body 101. Components of a lighting circuit 106, including a transformer and a capacitor, are incorporated in the lighting circuit unit 105. The lighting circuit is electrically connected to the discharge bulb 104 through a socket connector 107 and a connector 108 within the casing of the lighting circuit unit 105. Thus, the secondary winding of the lighting circuit is accommodated in the casing of the lighting circuit unit 105. As a result of this construction, the secondary winding is not exposed outside the casing, which in turn ensures safety.

However, because the lighting circuit unit 105 is arranged on the back of the lamp body 101, the construction of the lamp inevitably makes the depth L of the rear part of the lamp large. Among the components constituting the lighting circuit, the starter circuit that is formed of the transformer and the capacitor in particular uses large-sized components. Thus, there is a limit to reducing the size of the lighting circuit unit, and hence it is unavoidable that the depth L is rather large.

A motor vehicle such as a truck requires headlamps having a particularly high luminance. On the other hand, the available space for mounting the headlamps is limited because the distance between the front surface of the body of the vehicle and the dashboard, especially on the driver's side, is short in a truck. Therefore, it is not possible to mount a headlamp whose depth is large within the available space, making it difficult to mount a discharge bulb headlamp incorporating a high voltage power supply on this type of motor vehicle.

Further, the entire lighting circuit unit must be removed in order to replace the discharge bulb or to perform a similar operation. Since the lighting circuit unit is heavy because of the starter circuit, operability in removing the lighting circuit unit is impaired. If the space at the back of the lamp is narrow, it is difficult to remove the lighting circuit unit from the lamp body and thereafter replace the discharge bulb. Further, as shown by phantom lines in FIG. 10, the lighting circuit unit is arranged so as to project into the automobile body when the headlamp is mounted on the automobile body.

Moreover, because the distance is between the automobile body and the position of heavy circuit components, which generally define the center of gravity of the lighting circuit unit, the lighting circuit unit is susceptible to vibration. As a result, it is difficult to protect the lamp mounting section of the automobile from damage due to vibration. This problem also arises in the case where a discharge bulb is used in a lamp such as a searchlight where attempts are made to make the lamp thin-structured and small in size. Such lamps are generally difficult to attach to and detach from other pieces of equipment.

SUMMARY OF THE INVENTION

An object of the invention therefore is to provide a lamp having a discharge bulb as a light source and which has a thin structure due to a reduction in the depth at the back of the lamp.

Another object of the invention is to provide a lamp that allows the discharge bulb to be mounted and removed easily and that has improved vibration proofing.

The invention is applied to a lamp using as a light source a discharge bulb incorporated in a lamp body and in which a lighting circuit for operating the discharge bulb is integrally incorporated with the lamp body. Such lamp is characterized in that a case for accommodating the lighting circuit is attached to the lamp body at a back position of a socket of the discharge bulb, and components constituting the lighting circuit are arranged in an outer circumferential region of the socket of the discharge bulb. By the outer circumferential region it is intended to mean both side regions of the socket of the discharge bulb, including the lower region of the socket or, in some cases, a region including the upper region of the socket. Further, the invention is also characterized in that an opening is formed in a rear portion of the case confronting the socket, and a cover for covering the opening is removably arranged over the opening.

Still further, the invention is characterized in that the case for accommodating the lighting circuit is splittable in structure and includes an upper case and a lower case. The upper case has an opening formed therein, and the lower case accommodates at least some of the components constituting the lighting circuit. The upper case is attached to the lamp body, and the lower case is removably attached to the upper case. A partition wall for partitioning the upper case from the lower case is arranged at the boundary between the upper case and the lower case, and an insertion hole for a cord is formed in the partition wall, the cord serving to electrically connect the lighting circuit to the discharge bulb. The case may be made of metal.

BRIEF DESCRIPTION OF THE DRAWINGS

FIG. 2 is a schematic front view of the first embodiment of embodiment of the invention;

FIG. 3 is a horizontal sectional view taken along a line A—A in FIG. 2;

FIG. 9 is a sectional view showing the assembled condition of the lighting circuit case of FIG. 8.

DESCRIPTION OF THE PREFERRED EMBODIMENTS

Figure 1:
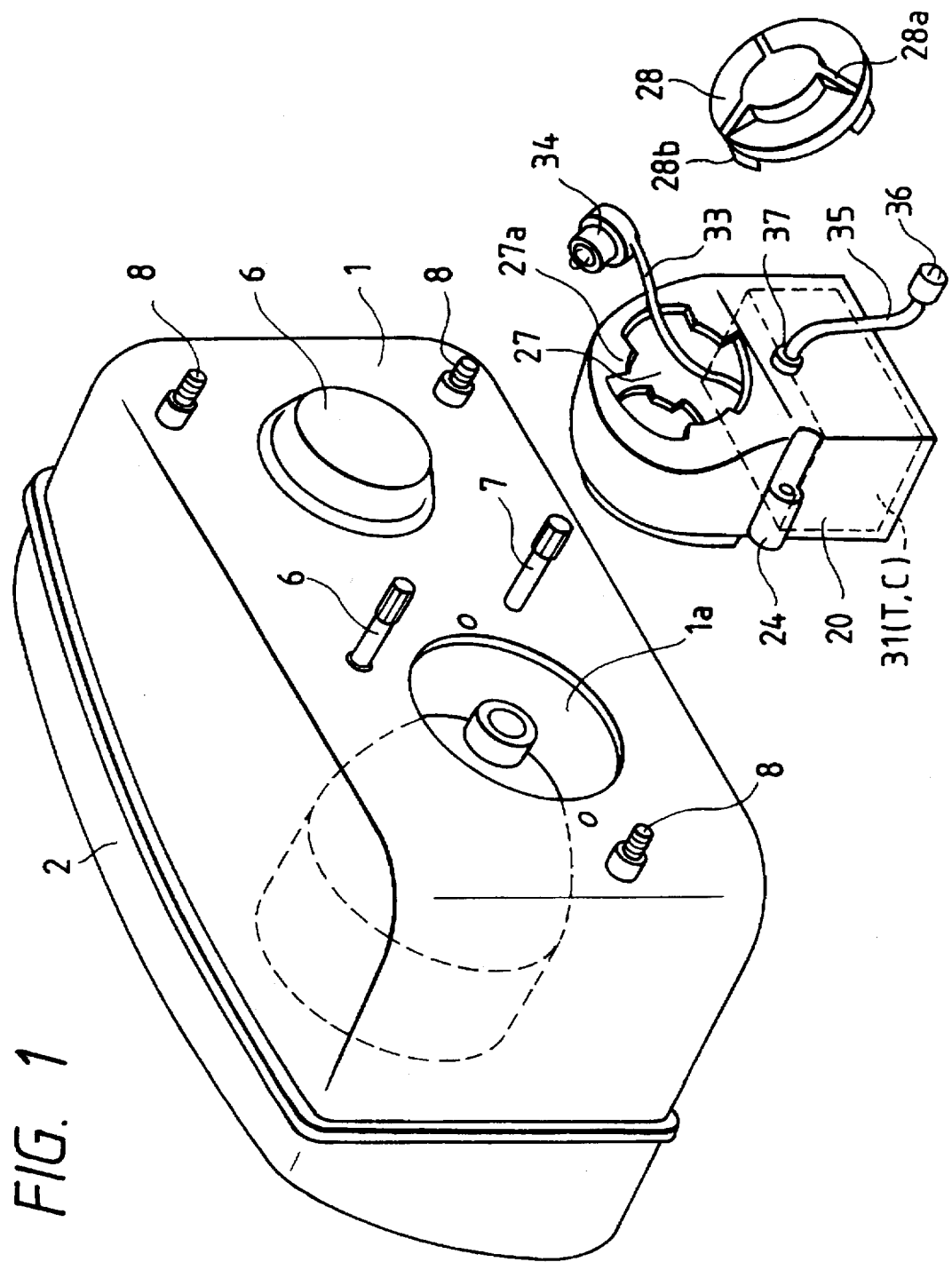
FIG. 1 is a perspective view showing a main portion of a first embodiment of the invention in exploded form.

The invention will now be described with reference to the drawings. FIG. 1 is a partially exploded perspective view showing a main portion of a first embodiment in which a lamp of the invention is applied to a headlamp of an automobile. FIG. 2 is a schematic front view illustrating the assembled state of the lamp shown in FIG. 1, and FIG. 3 is a horizontal sectional view taken along a line A—A in FIG. 2.

The headlamp of this embodiment is a so-called four-beam type headlamp, which includes a main-beam headlamp HHL and a low-beam headlamp LHL which are integrated with each other. The lamp body 1 has a lens 2 attached to the front opening thereof, thereby defining a lamp chamber. A reflector 3A is arranged within the lamp chamber. The reflector 3A serves also as the reflector of the main-beam headlamp HHL. Further, a pseudo-reflector 3B of the low-beam headlamp LHL is arranged within an adjacent region of the lamp chamber. The pseudo-reflector 3B has an opening 3a in which a low-beam unit 10 is incorporated. In the main-beam lamp HHL, a bulb insertion hole 3b is formed in the rear portion the reflector 3A, and a bulb 5 is supported by a socket connector 4 fitted into this hole. A bulb insertion hole 1b is formed in the rear portion of the lamp body 1 behind the socket connector 4, and the bulb insertion hole 1b is sealed with a back cover 9.

The low-beam unit 10 is a projector lamp which includes a converging reflector 11 whose surface is formed as an ellipsoid of revolution, a cylindrical lens holder 12 attached to the front opening of the converging reflector 11, and a lens 13 attached to the front end portion of the lens holder 12. The low-beam unit 10 is supported by the lamp body 1 so as to be adjustable in both vertical and horizontal directions with respect to the lamp body 1 through aiming adjusting mechanisms 6, 7, only parts of which are shown in FIG. 1. Since the aiming adjusting mechanisms including aiming bolts are of a known construction, a further detailed description thereof will be omitted.

A socket connector 15 is inserted into a bulb insertion hole 14 formed in the rear portion of the converging reflector 11. A discharge bulb 16 is supported at the focal point of the converging reflector 11 by the socket connector 15. It may be noted that a shade 17, a heat shielding plate 18, and the like that serve to provide a predetermined luminous intensity distribution characteristic with respect to the discharge bulb 16 are supported by the lens holder 12.

Figure 4:
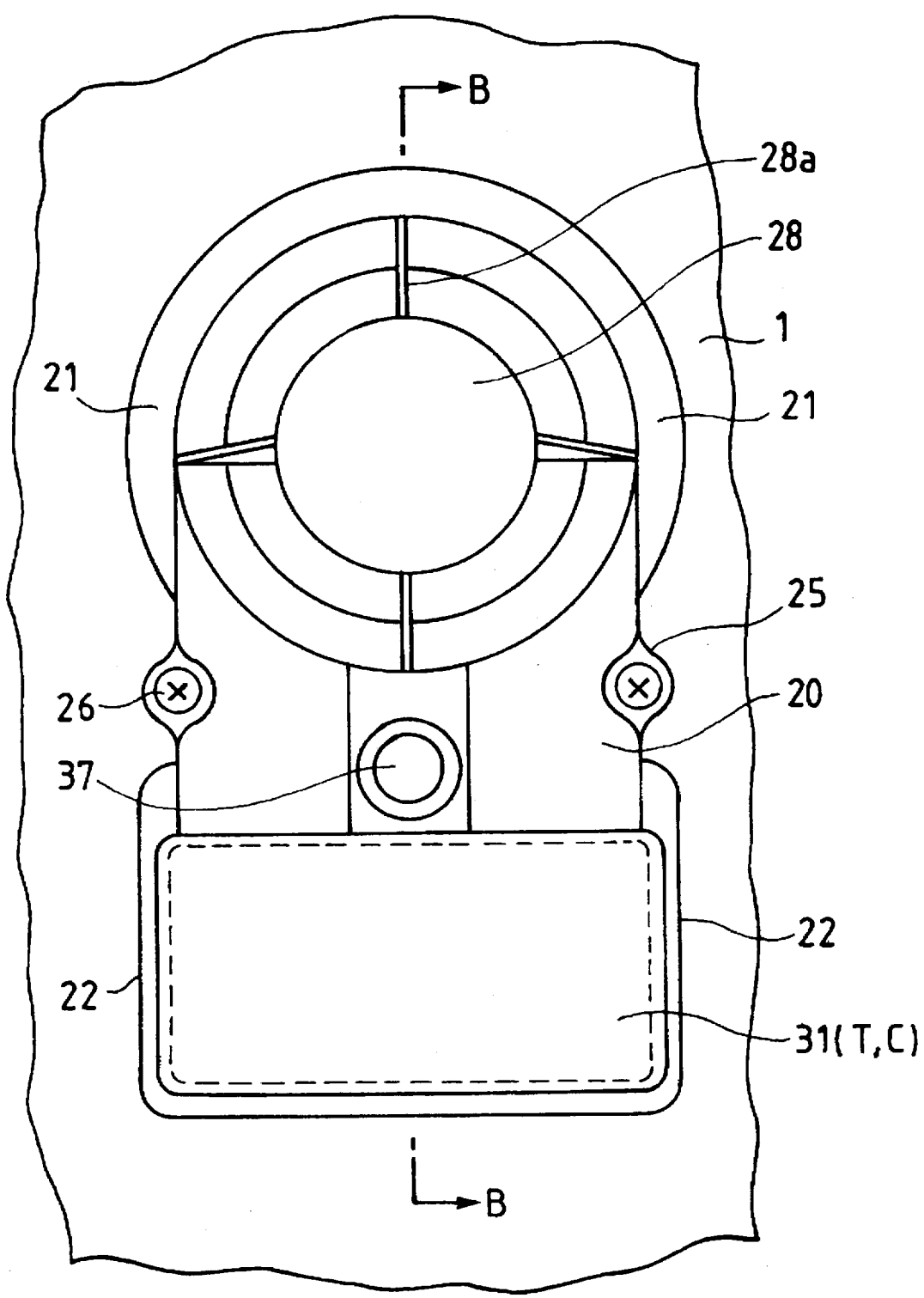
FIG. 4 is a rear view showing a main portion of a lamp including a lighting circuit case.
Figure 5:
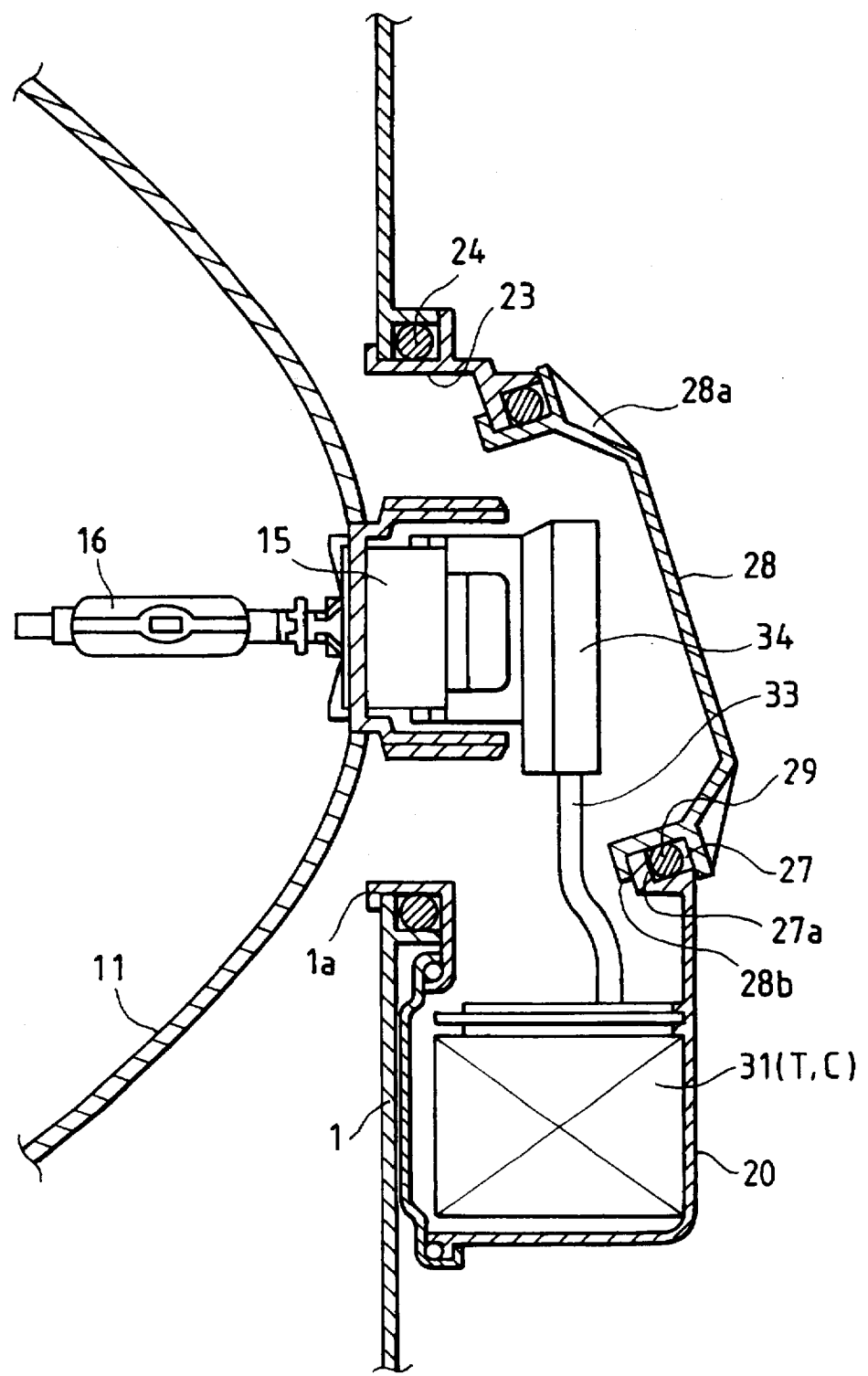
FIG. 5 is a longitudinal sectional view taken along a line B—B in FIG. 4.

An opening window 1a allowing the discharge bulb 16 to be removed therefrom together with the socket connector 15 is formed in the rear portion of the lamp body 1, which has the low-beam unit 10 incorporated therein. A lighting circuit case 20 that includes component of a lighting circuit, i.e., a starter section incorporated therein, is attached to the opening window 1a, the lighting circuit serving to operate the discharge bulb 16. As shown in FIG. 4, which is a rear view, as well as in FIG. 5, which is a longitudinal sectional view taken along a line B—B in FIG. 4, the lighting circuit case 20 has an upper region 21 thereof, which has the shape of a relatively thin-walled cylindrical container that covers the socket connector 15 from the back while being fitted into the opening window 1a of the lamp body 1, and a lower region 22, which has the shape of a rectangular container which extends from the upper region 21 downward a predetermined length without substantially changing the width of the upper region 21.

The inner surface of the upper region 21 of the lighting circuit case 20 is attached to the opening window 1a of the lamp body 1, which is circular. That is, a short cylindrical portion 23 is arranged over the inner surface of the upper region 21 of the lighting circuit case 20 and is fitted into the opening window 1a with a seal ring 24 interposed therebetween, and then the lighting circuit case 20 is integrally fixed to and supported by the lamp body with bolts 26 by inserting the bolts 26 into screw insertion portions 25 arranged on both sides with respect to the mid line of the lighting circuit case.

Further, a slightly upwardly sloped circular opening 27 is arranged at the rear of the upper region 21 of the lighting circuit case 20. A circular saucer-like cover 28 formed integrally with ribs 28a is removably attached to the opening 27. The ribs 28a are arranged at a plurality of positions over the outer circumference of the opening 27.

Part of the structure for removably attaching the cover 28 to the case opening 27 is shown in FIG. 1. That is, engagement pieces 27a projecting inwardly at a plurality of positions over the circumference of the inner edge of the opening 27 are arranged integrally with the opening 27, whereas engagement pieces 28b projecting outwardly at a plurality of positions over the circumferential edge of the cover 28 are formed integrally with the cover 28. The circumferential edge portion of the cover 28 is inserted into the opening with the respective engagement pieces 27a, 28b staggered in a circumferential direction. The cover 28 is thereafter rotated in a circumferential direction using the ribs 28a, so that the respective engagement pieces 27a, 28b engage with one another. That is, a so-called "bayonet" structure is formed. A waterproof seal between the cover 28 and the opening 27 is provided by a seal ring 29.

Figure 6:
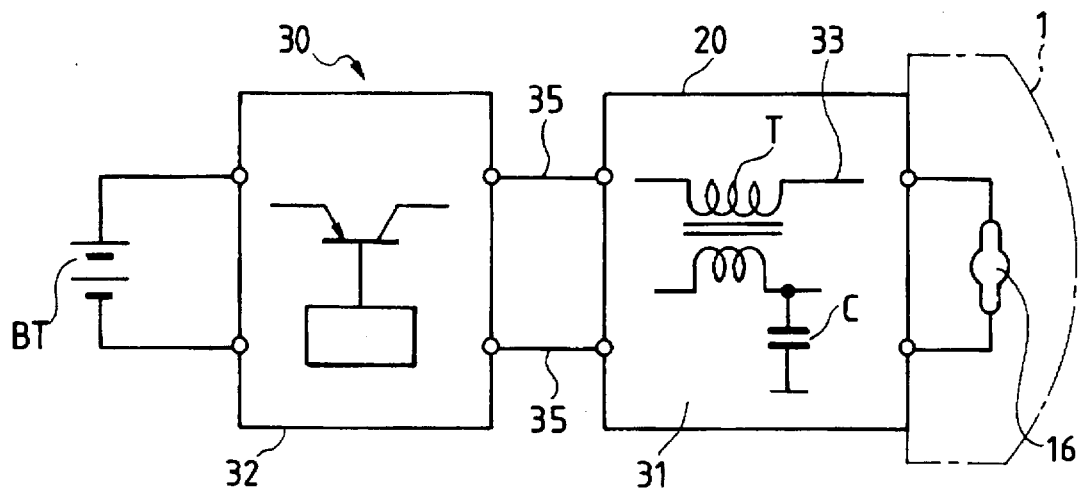
FIG. 6 is a block circuit diagram of the lighting circuit.
Figure 10:
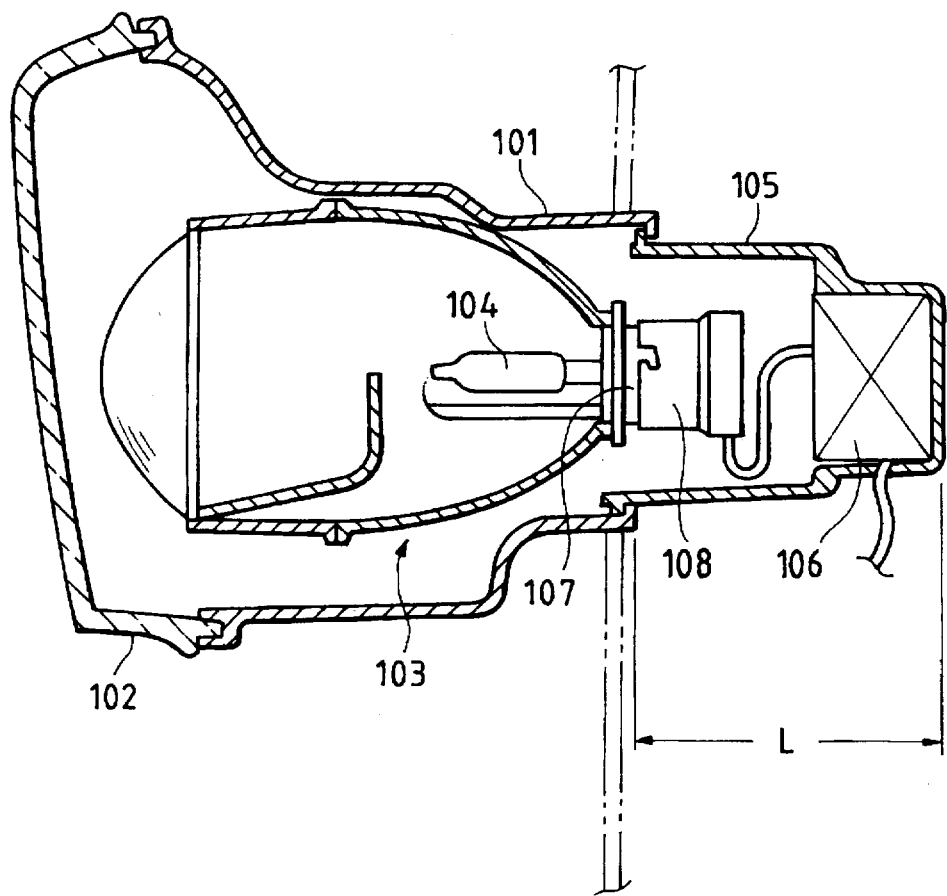
FIG. 10 is a sectional view showing part of a conventional lamp using a discharge lamp as a light source.

On the other hand, the lower region of the rectangular container-like lighting circuit case 20 incorporates therein a starter circuit 31, which is one of the circuits constituting a lighting circuit 30. The lighting circuit 30 includes, as shown, e.g., in FIG. 6, a dc-ac converter circuit 32 and a starter circuit 31. The dc-ac converter circuit 32 changes the dc voltage of a battery BT of the automobile to an ac voltage. The starter circuit 31 boosts the ac voltage to a voltage sufficient to effect discharge within the discharge bulb. The starter circuit 31 is a known circuit including a transformer and a capacitor. A transformer T and a capacitor C, which are large-sized and heavy compared with the other components of the starter circuit, are incorporated within the lower region 22 of the lighting circuit case 20, while the remainder of the components, which are relatively light, are arranged either above the transformer T and the capacitor C or around the opening 27 of the upper region 21. Therefore, the heavier components of the starter circuit 31 are arranged immediately below the socket connector 15 of the discharge bulb 16.

For ensuring stable weight balance between the left and the right side of the lighting circuit case, the heavy transformer T may be arranged in substantially the middle portion of the lighting circuit case 20, while the lighter components may be arranged in spaces on both sides of the transformer T. Further, the secondary wiring of the starter circuit 31 to which the high voltage is applied is constructed in such a manner that a connector 34 is connected to a cord 33 extending from the starter circuit 31, and the connector 34 is fitted into the socket connector 15. Still further, a low-voltage primary wiring cord 35 of the starter circuit 31 extends from the lighting circuit case 20 through, e.g., a hole 37 formed in the rear portion of the lighting circuit case 20 and is connected to the dc-ac converter circuit 32 of the lighting circuit shown in FIG. 6 by a connector 36. A waterproof seal around the low-voltage primary wiring cord 35 is provided by a rubber bushing or the like extending from the lighting circuit case 20.

The aforementioned four-beam type headlamp is designed to be attached to the automobile body with a plurality of stud bolts 8 projecting rearward in the rear portion of the lamp body 1, as shown in FIG. 1. When the headlamp is attached to the automobile body, the lighting circuit case 20 attached to the back of the lamp body 1 is positioned inside the automobile body through the attaching hole formed in the automobile body.

According to this construction, the lighting circuit case 20 is designed such that the lower region 22 thereof is located immediately below the socket connector 15 of the discharge bulb 16 and the starter circuit 31 is accommodated in the lower region 22. With this construction, even if the distance by which the lighting circuit case 20 projects from the back of the lamp body is reduced, the available space can nevertheless still adequately accommodate the starter circuit 31. As a result, the headlamp including the lighting circuit case 20 can be made thin as a whole. Further, since the starter circuit 31 is located immediately below the socket connector 15, the center of gravity of the starter circuit 31, including the heavy components such as the transformer, is located immediately below the socket connector 15. Since the lamp body 1 is attached to the automobile body by the stud bolts 8 in the rear portion thereof, the distance between the center of gravity of the starter circuit 31 and the automobile body is short. As a result, vibration of the starter circuit 31 and the lighting circuit case 20 caused by shock and vibration of the automobile is suppressed, which in turn contributes to improving the overall vibration proofing effect of the lamp.

Figure 7:
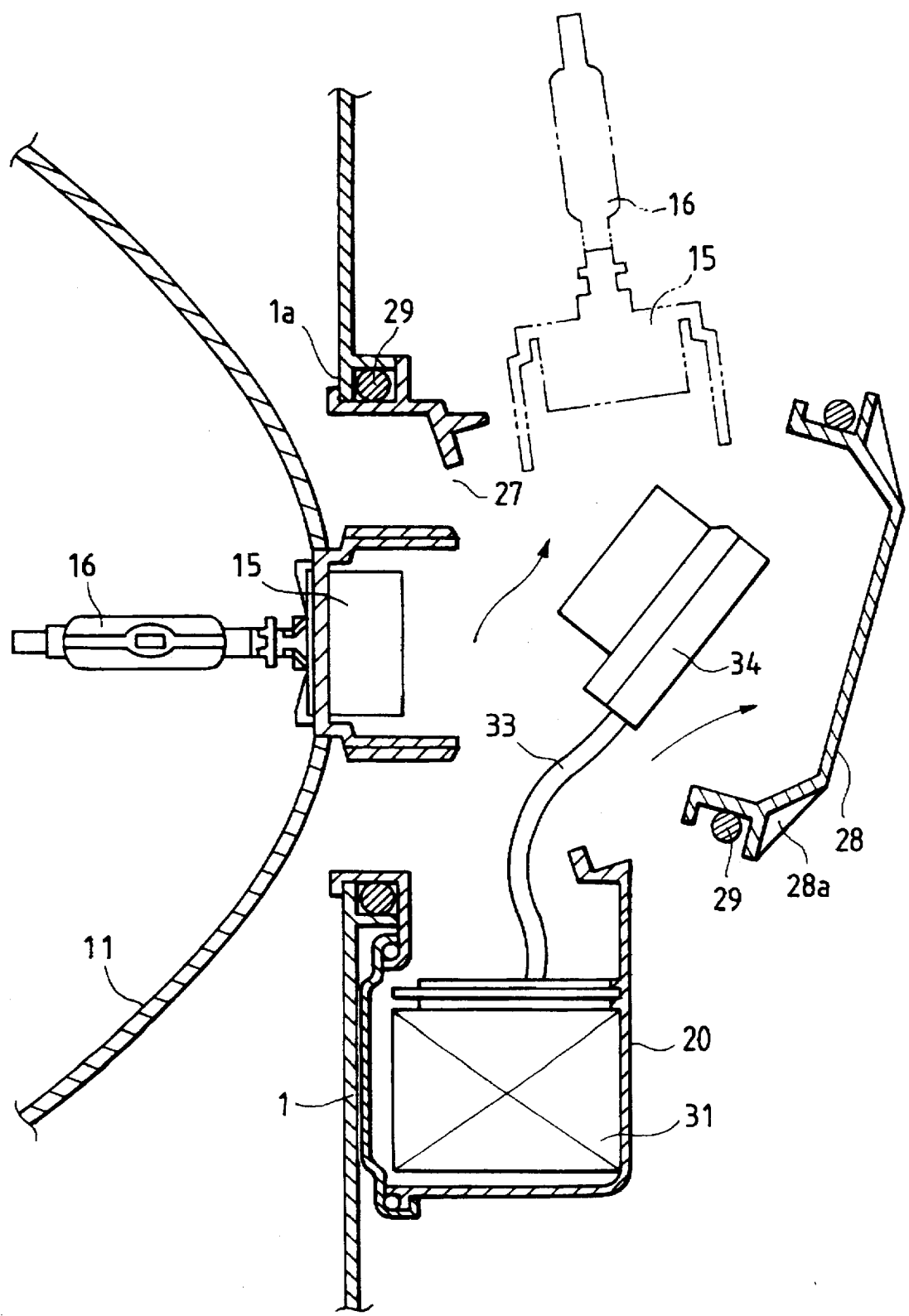
FIG. 7 is a sectional view illustrating the manner of replacement of a discharge bulb.

In addition, as shown in FIG. 7, the opening 27 can be uncovered by taking advantage of the bayonet structure of the lighting circuit case 20, i.e., by manually rotating the cover 28 arranged on the lighting circuit case 20 through the ribs 28a and removing the cover 28 from the lighting circuit case 20, so that the upper region 21 of the lighting circuit case 20 can be exposed by the opening 27. Since the socket connector 15 is exposed in this region, the user can attach and detach the socket connector 15 to and from the connector 34 and replace the socket connector 15 and the discharge bulb 16 through the opening 27. Since the lighting circuit case 20 is not required to be removed from the lamp body 1 during these operations, the operations can be performed with ease, even if the space to the rear of the lamp body is limited.

Figure 8:
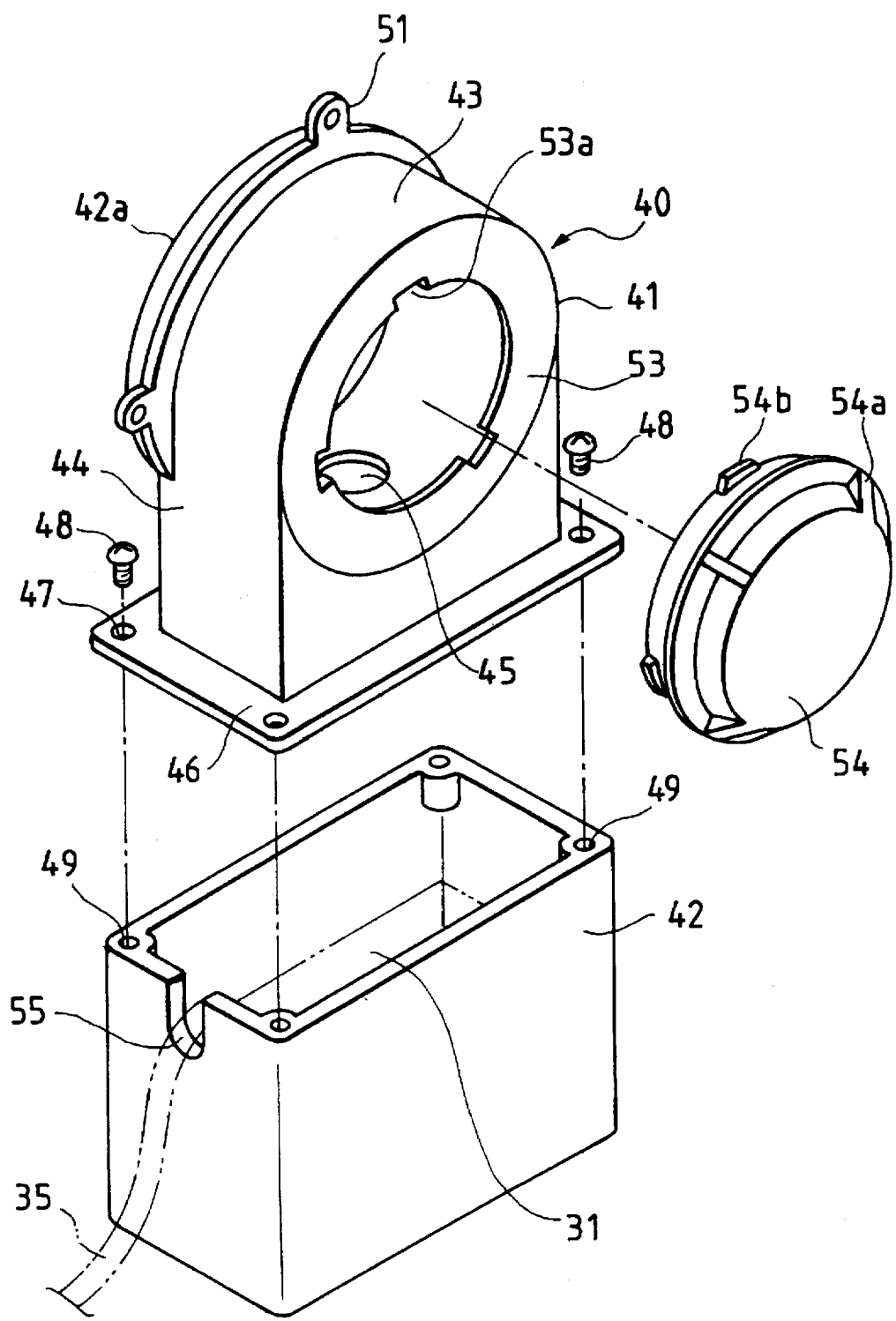
FIG. 8 is a partially exploded perspective view of a lighting circuit case constructed in accordance with a second embodiment of the invention.

FIGS. 8 and 9 are, respectively, partially exploded perspective views showing a second embodiment of the invention and a longitudinal sectional view showing the assembled condition of the second embodiment.

This embodiment is characterized in that a lighting circuit case 40 can be divided into an upper case 41 and a lower case 42. That is, the upper case 41 corresponds to the upper region of the lighting circuit case 20 of the first embodiment, and the lower case 42 corresponds to the lower region. The upper case 41 is formed so that the upper half thereof is a horizontally extending circular cylindrical portion 43 and the lower half thereof is a vertically extending square case portion 44. The circular cylindrical portion 43 and the square case portion 44 internally communicate with each other through an insertion hole 45 formed in the bottom surface of the circular cylindrical portion 43. A flange 46 is formed integrally with the lower edge of the square case porion 44. Machine screws 48 are inserted into small holes 47 formed at the four corners of the flange 46 and screwed into tapped holes 49 formed at the four corners of the opening of the lower case 42, so that the upper case 41 and the lower case 42 are integrated with each other.

The upper case 41 is integrally fixed to and supported by the lamp body 1 by first fitting an inner end portion 42a of the circular cylindrical portion 43 into the opening window 1a of the lamp body 1 with a seal ring 50 interposed therebetween, and then inserting bolts 52 into tongue-like screw insertion portions 51 arranged at a plurality of positions around the inner end portion 42a. Further, an inwardly projecting inner flange 53 is formed integrally with the outer end portion of the circular cylindrical portion 43. A circular saucer-like cover 54 is removably attached to the inner edge portion of the inner flange 53. This cover 54 has not only ribs 54a projecting from a plurality of positions on the outer circumferential surface, but also engagement pieces 54b projecting outward at a plurality of positions around the circumferential edge thereof. The cover 54 is engaged with the upper case 41 through the bayonet structure formed by these engagement pieces 54b engaging with notched portions 53a arranged at a plurality of positions along the inner edge portion of the inner flange 53 of the upper case 41. In addition, the engaged portion is waterproofed by the seal ring 29, similarly to the first embodiment.

The rectangular container-like lower case 42 incorporates therein the starter circuit 31 of the lighting circuit 30, similarly to the first embodiment. Since the construction of the starter circuit 31 is the same as that in the first embodiment, a further detailed description thereof will be omitted.

The cord 33 to which the high voltage is applied in the starter circuit 31 incorporated in the lower case 42 is inserted into the square case portion 44 of the upper case 41 and further introduced into the circular cylindrical portion 43 via the insertion hole 45 formed in the bottom surface of the circular cylindrical portion 43. Then, the connector 34 is connected to the front end portion of the cord 33 inside the cylindrical portion 43 and fitted into the socket connector 15. Further, the low-voltage primary wiring cord 35 of the starter circuit 31 passes through a notch 55 arranged at a portion connecting the lower case 42 to the upper case 41 on the upper edge portion of the lower case 42 and is led outside the lower case 42 through waterproofing structure formed, e.g., by a rubber bushing (not shown).

In the second embodiment, electromagnetic radiation from the starter circuit 31, the cord 33, and the discharge bulb 16 is shielded by the lighting circuit case 40 when the upper case 41 and the lower case 42 are integrated to each other. Further, the discharge bulb 16 can be easily replaced upon removing the cover 54. Thus, the effects of the second embodiment are similar to those of the first embodiment.

Moreover, the second embodiment allows the starter circuit 31 to be inspected and parts to be replaced in the following way: The lower case 42 is removed from the upper case 41 by releasing the machine screws 48, and the lower case 42 is then removed, with the upper case 41 remaining attached to the lamp body 1, so that the starter circuit 31 accommodated in the lower case 41 can be inspected and parts of the starter circuit 31 replaced as needed. With the cord 33 and the starter circuit 31 connected through a connector 56 inside the lower case 42 as shown in FIG. 9, the starter circuit 31 can be separated at the connection portion, which allows the lower case 42 to be mounted and removed extremely simply. Further, the operation of assembling the lighting circuit case 40 and the lamp can be performed easily.

Still further, since the cord 33 is inserted through the insertion hole 45 arranged in the circumferential wall of the circular cylindrical portion 43 of the upper case 41 in the second embodiment, the circular cylindrical portion 43 is shielded from the square case portion 44 by the circumferential wall of the circular cylindrical portion 43. This construction is particularly advantageous in blocking electromagnetic waves generated in the starter circuit 31 incorporated in the lower case 42 from radiating as far as the circular cylindrical portion 43 by containing such electromagnetic waves inside the lower case 42 and the square case portion 44 of the upper case 41. As a result, interference caused by such electromagnetic waves can be controlled effectively.

While examples in which the invention is applied to a four-beam type headlamp have described with reference to the first and second embodiments, the invention may, of course, be similarly applied to other types of vehicular lamps which use a discharge bulb, such as two-beam type headlamps and fog lamps, as well as various other types of lamps including searchlights for use in police and fire fighting activities, stadium lights, etc. Further, while projection-type lamps have been described as examples in the aforementioned embodiments, the invention can be applied to reflector-type lamps having a parabolic reflector surface or a free-form reflector surface.

Still further, while the lighting circuit cases of the aforementioned embodiments are formed so that the upper region is circular cylindrically shaped so as to cover the socket opening window of the lamp body, and the portion immediately below the upper region is rectangularly shaped, the lighting circuit case may be elliptical or oval as a whole, or be vertically elongated rectangular in shape. Still further, a portion at which the lighting circuit case may interfere with the aiming adjusting mechanisms and the like (whose detailed description is omitted) can be a member formed by partially notching the lighting circuit case.

Yet further, while the lighting circuit case is attached to the lamp body by fastening means such as bolts, the case may also be attached to the lamp body by means of a bayonet structure or the like. Still further, the cover may be attached to the lighting circuit case by screws or the like. However, for facilitating the operation of mounting and removing the discharge bulb and the socket connector, a bayonet structure which allows the cover to be attached to and detached from the lighting circuit case in a single motion is preferred.

The components constituting the lighting circuit are arranged in the lower region of the discharge bulb socket since the lighting circuit case is attached to the lamp body vertically in the first and second embodiments. However, if the lighting circuit case is attached to the lamp body by means of a bayonet structure, the lighting circuit case can be attached to the lamp body at any desired orientation, i.e., obliquely, horizontally, or upside down. In these cases, the components constituting the lighting circuit are arranged in the side regions or in the upper region of the discharge bulb socket, i.e., in the outer circumferential region of the discharge bulb socket. These constructions can, of course, provide the same advantages as described above.

As described in the foregoing, the invention is characterized in that the case for accommodating the lighting circuit that operates the discharge bulb is attached to the lamp body to the rear of the discharge bulb socket, and in that the components constituting the lighting circuit are arranged in the outer circumferential region of the discharge bulb socket. As a result, it is not necessary to provide a space for arranging the lighting circuit completely to the rear of the socket, thus contributing to making the lamp thin in structure. At the same time, since the heavy components constituting the lighting circuit are arranged close to where the lamp is attached to the vehicle, damage to the lamp by vibration is prevented.

Furthermore, the invention is characterized in that an opening is formed in the rear of the case confronting the socket, and in that the cover for covering such opening is removably arranged. Therefore, the discharge bulb socket is protected by the cover merely by placing the cover over the socket, and the discharge bulb socket can easily be replaced via the opening upon removing the cover. Therefore, it is not necessary to remove the lighting circuit case, which contributes to improving the operability of the lamp. In addition, if the lighting circuit case is of a split structure, maintenance and assembly of the lighting circuit can be performed easily.

What is claimed is:

1. A lamp having a discharge bulb as a light source, comprising: a lamp body; a socket and a discharge bulb received in said socket, said socket being attached to said lamp body via a hole formed in a rear portion of said lamp body; a lighting circuit for producing a high voltage for operating the discharge bulb, said lighting circuit comprising a plurality of constituent circuit components; and a case accommodating said lighting circuit attached to said lamp body rearward of said socket, at least some of said constituent circuit components being arranged in said case in an outer circumferential region of said socket.

2. A lamp having a discharge bulb according to claim 1, wherein an opening is formed in a rear position of said case confronting said socket, and further comprising a removable cover covering said opening for providing access to said socket.

3. A lamp having a discharge bulb according to claim 2, further comprising a bayonet structure for removably joining said removable cover to said case.

4. A lamp having a discharge bulb according to claim 1, wherein said case accommodating said lighting circuit comprises an upper case and a lower case joined to said upper case, said lower case accommodating at least part of said constituent circuit components.

5. A lamp having a discharge bulb according to claim 4, wherein said upper case is attached to said lamp body, and said lower case is removably attached to said upper case.

6. A lamp having a discharge bulb according to claim 4, wherein said upper case has a generally cylindrical shape, and said lower case has a generally rectangular container shape.

7. A lamp having a discharge bulb according to claim 4, further comprising a partition wall for partitioning said upper case from said lower case arranged at a boundary region between said upper case and said lower case, an insertion hole for a cord being formed in said partition wall, said cord electrically connecting said lighting circuit to said discharge bulb.

8. A lamp having a discharge bulb according to claim 4, wherein said constituent circuit components accommodated in said lower case comprise a transformer.

9. A lamp having a discharge bulb according to claim 8, wherein said transformer is disposed symmetrically with respect to a midline of said lower case.

10. A lamp having a discharge bulb according to claim 8, wherein constituent circuit components accommodated in said upper case are lighter than circuit components accommodated in said lower case.

11. A lamp having a discharge bulb according to claim 1, wherein said case is made of metal.

12. A lamp having a discharge bulb as a light source, comprising: a lamp body; a socket and a discharge bulb received in said socket, said socket being attached to said lamp body via a hole formed in a rear portion of said lamp body; a lighting circuit for producing a high voltage for operating the discharge bulb, said lighting circuit comprising a plurality of constituent circuit components; and a case accommodating said lighting circuit attached to said lamp body rearward of said socket, said case comprising an upper case and a lower case removably joined to said upper case, a portion of said upper case having a generally cylindrical shape joining a generally rectangular container shaped portion of said upper case, said lower case having a generally rectangular container shape, said case further comprising a partition wall partitioning said upper case from said lower case arranged at a boundary region between said rectangular container shaped portion of said upper case and said lower case, an insertion hole for a cord being formed in said partition wall, said cord electrically connecting said lighting circuit to said discharge bulb, at least some of said constituent circuit components being arranged in said case in an outer circumferential region of said socket.

13. A lamp having a discharge bulb according to claim 12, wherein an opening is formed in a rear position of said case confronting said socket, and further comprising a removable cover covering said opening for providing access to said socket.

14. A lamp having a discharge bulb according to claim 13, further comprising a bayonet structure for removably joining said removable cover to said case.

15. A lamp having a discharge bulb as a light source, comprising:

a lamp body;

a socket and a discharge bulb received in said socket, said socket being attached to said lamp body via a hole formed in a rear portion of said lamp body;

a lighting circuit for producing a high voltage for operating the discharge bulb, said lighting circuit comprising a plurality of constituent circuit components; and a case accommodating said lighting circuit attached to said lamp body rearward of said socket, at least some of said constituent circuit components being arranged in said case in an outer circumferential region of said socket, wherein said case accommodating said lighting circuit comprises an upper case and a lower case joined to said upper case, said lower case accommodating at least part of said constituent circuit components, and wherein said upper case is attached to said lamp body, and said lower case is removably attached to said upper case.

16. A lamp having a discharge bulb according to claim 1, wherein said at least some of said constituent circuit components are disposed adjacent a rear wall of said lamp body.

17. A lamp having a discharge bulb according to claim 1, wherein said at least some of said constituent circuit components are disposed immediately below a socket connector for connecting the discharge bulb to said lighting circuit.

18. A lamp having a discharge bulb according to claim 1, wherein said at least some of said constituent circuit components comprise a transformer and a capacitor.

19. A lamp having a discharge bulb according to claim 1, wherein said at least some of said constituent circuit components are arranged to one side of, or above or below, said socket.

* * * * *